United States Patent [19]

Heitzmann

[11] Patent Number: 5,150,918
[45] Date of Patent: Sep. 29, 1992

[54] TRAILING ARM SUSPENSION FOR VEHICLE

[75] Inventor: David E. Heitzmann, Union, Mich.
[73] Assignee: MOR/ryde International, Inc., Elkhart, Ind.
[21] Appl. No.: 694,207
[22] Filed: May 1, 1991
[51] Int. Cl.⁵ .............................................. B60G 11/22
[52] U.S. Cl. .................................. 280/716; 280/688; 267/257
[58] Field of Search ............... 280/725, 681, 682, 685, 280/687, 712, 713, 688, 716, 722, 405.1, 723, 689; 267/257

[56] References Cited

U.S. PATENT DOCUMENTS

| | | | |
|---|---|---|---|
| 3,069,149 | 12/1962 | Neff | 267/33 |
| 3,120,952 | 2/1964 | Hendrickson | 267/21 |
| 3,495,848 | 2/1970 | Hickman | 267/257 |
| 3,547,215 | 12/1970 | Bird | 180/71 |
| 3,994,512 | 11/1976 | Parker et al. | 280/687 |
| 4,213,633 | 7/1980 | Moore | 280/716 |
| 4,995,636 | 2/1991 | Hall et al. | 180/716 |
| 5,047,934 | 9/1991 | Saito | 280/707 |

Primary Examiner—Charles A. Marmor
Assistant Examiner—Paul Dickson
Attorney, Agent, or Firm—Joseph P. Gastel

[57] ABSTRACT

A trailing arm construction for the rear wheels of an automotive vehicle including a trailing arm, a pivotal mounting for the fore portion of the trailing arm, a shear rubber spring mounted directly between the vehicle frame and a central portion of the trailing arm, a bracket for attaching the driven vehicle axle to the central portion of the trailing arm, and a coil spring mounted directly between the aft portion of the trailing arm and the vehicle frame. A construction as described including a tag arm construction for mounting a wheel behind the rear wheels including a tag arm having a fore portion pivotally mounted directly on the vehicle frame, a bracket on the central portion of the tag arm for mounting an axle, and a shear rubber spring mounted directly between the vehicle frame and the aft portion of the tag arm.

19 Claims, 5 Drawing Sheets

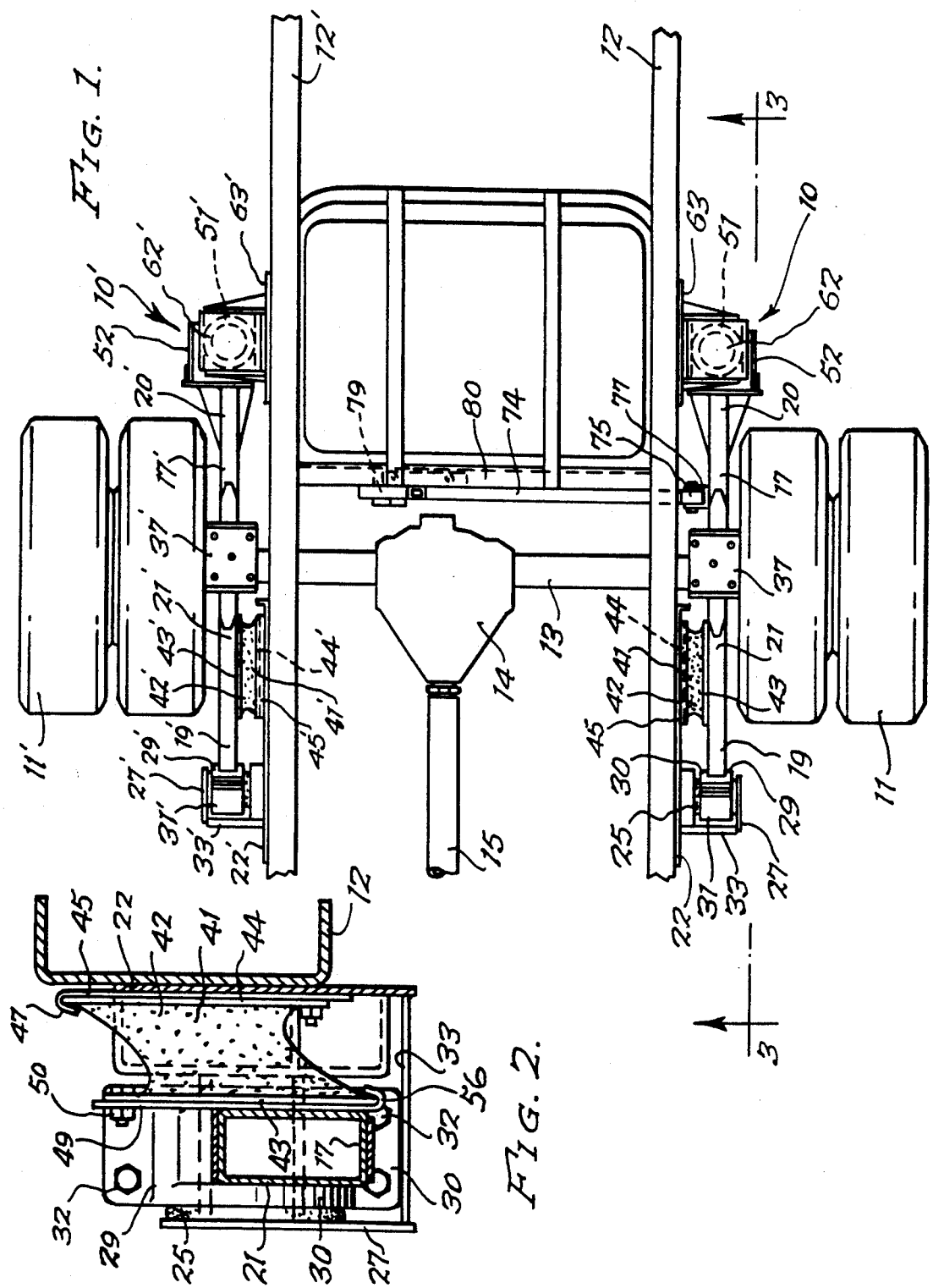

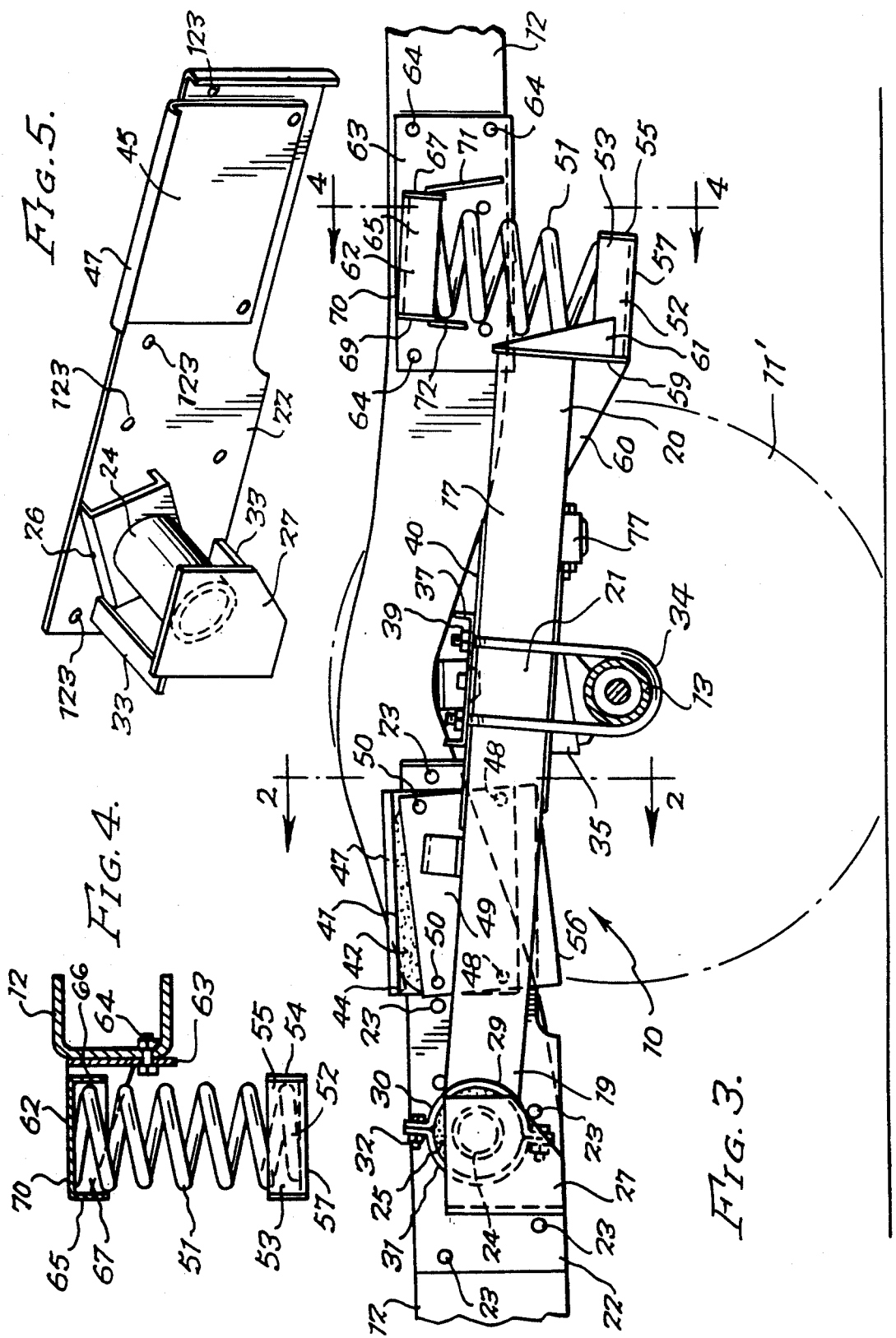

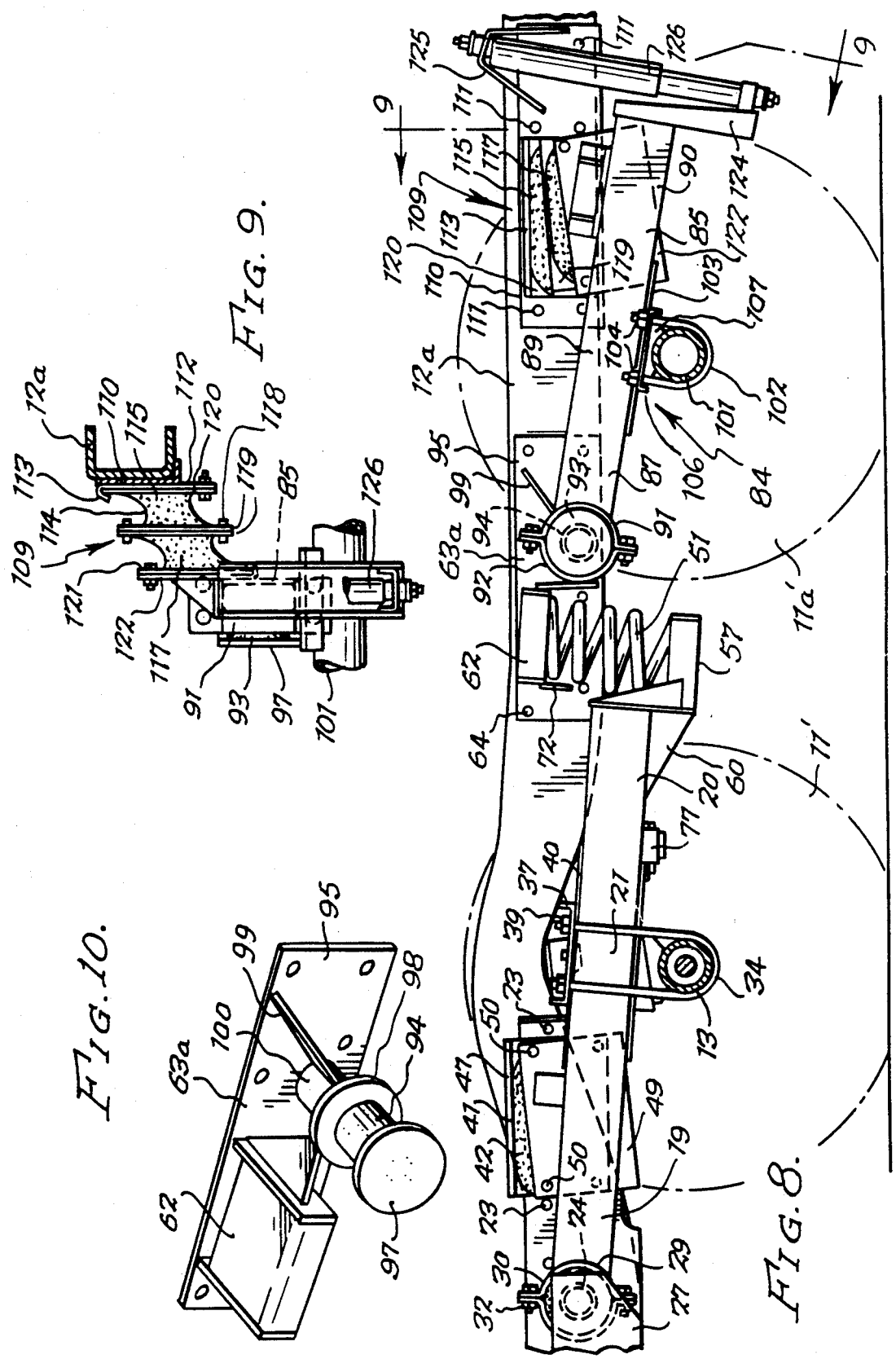

TRAILING ARM SUSPENSION FOR VEHICLE

BACKGROUND OF THE INVENTION

In certain automotive vehicles the axle for the rear wheels is supported by a leaf spring and sway bar construction. However, because of the manner in which these are attached to the vehicle frame, the vehicle body has a tendency to roll certain amounts as the vehicle travels, and especially when it turns. This rolling is undesirable from both a quality of ride aspect and also from a safety aspect because of the instability which occurs.

SUMMARY OF THE INVENTION

It is accordingly one object of the present invention to provide an improved trailing arm suspension for an automotive vehicle which includes shear rubber springs mounted directly between trailing arms and the vehicle frame so as to greatly reduce rolling of the frame and thereby stabilize it during operation.

Another object of the present invention is to provide an improved trailing arm suspension utilizing shear rubber springs wherein the suspension eliminates the leaf springs and sway bars previously used.

A further object of the present invention is to provide an improved trailing arm suspension utilizing shear rubber springs which can replace leaf spring and sway bar constructions in the field and which can also be used for original equipment. Other objects and attendant advantages of the present invention will readily be perceived hereafter.

The present invention relates to a trailing arm axle suspension for a vehicle having a frame including a frame portion which extends longitudinally of said vehicle and an axle positioned under the frame comprising an elongated trailing arm having fore and aft and central portions extending longitudinally of said vehicle, first means for pivotally mounting said fore portion directly on said frame portion, shear rubber spring means, second means for mounting said shear rubber spring means directly between said central portion of said trailing arm and said frame portion, third means for securing said axle to said central portion of said trailing arm, coil spring means, and fourth means for securing said coil spring means directly between said frame portion and said aft portion of said trailing arm.

The present invention also includes the subject matter described in the immediately preceding paragraph in combination with a trailing tag arm having a tag arm fore portion and a tag arm central portion and a tag arm aft portion, means pivotally mounting said tag arm fore portion proximate the rear of the trailing arm, means securing a second axle on said tag arm central portion, second shear rubber spring means, and means securing said second shear rubber spring means directly between said frame portion and said tag arm aft portion.

The various aspects of the present invention will be more fully understood when the following portions of the specification are read in conjunction with the accompanying drawings wherein:

BRIEF DESCRIPTION OF THE DRAWINGS

FIG. 1 is a fragmentary plan view of the improved trailing arm suspensions mounted on the rear portions of the frame of a vehicle;

FIG. 2 is a cross sectional view taken substantially along line 2—2 of FIG. 3 and showing the shear rubber spring mounted directly between the vehicle frame portion and the trailing arm;

FIG. 3 is an enlarged cross sectional view taken substantially along line 3—3 of FIG. 1 and showing the improved trailing arm assembly in side elevation;

FIG. 4 is a cross sectional view taken substantially along line 4—4 of FIG. 3 and showing the mounting for the coil spring;

FIG. 5 is a perspective view of the mounting structure which attaches the shear rubber spring and the fore portion of the trailing arm to the vehicle frame portion;

FIG. 8 is a cross sectional view taken substantially along line 8—8 of FIG. 7 and showing the modified embodiment in side elevation;

FIG. 9 is a cross sectional view taken substantially along line 9—9 of FIG. 8 and showing the direct shear rubber spring mounting between the vehicle frame portion and the trailing tag arm; and FIG. 10 is a perspective view of the mounting plate which supports the coil spring of the front trailing arm and the fore portion of the tag arm.

DESCRIPTION OF THE PREFERRED EMBODIMENTS

Summarizing in advance, the improved trailing arm suspensions 10 and 10' are for the purpose of mounting the axle 13 and driven rear wheels 11 and 11' of a vehicle. These suspensions reduce body roll of the vehicle and thus stabilize it. The suspensions 10 and 10' eliminate the sway bar and spring suspension previously used and thus combine the functions of both the previously used springs and sway bars while improving the stability of the vehicle including minimizing its body roll. The trailing arm suspensions 10 and 10' can be used to replace existing spring and sway bar suspensions in the field on existing vehicles, and can also be used as original equipment.

Figure 6:
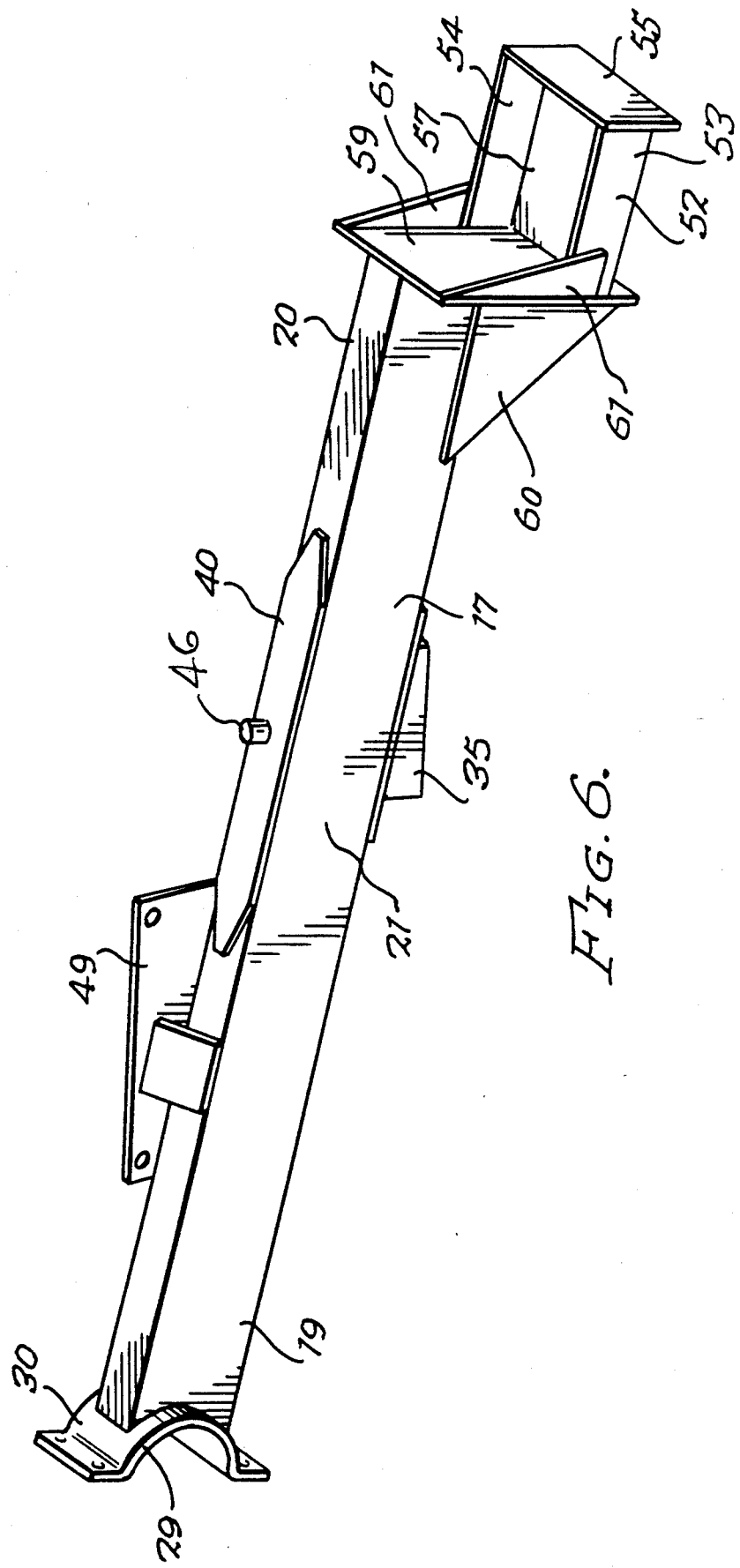
FIG. 6 is a perspective view of the trailing arm and associated structure.

The trailing arm suspensions 10 and 10' in the embodiment of FIGS. 1-6 are mirror images of each other. Thus only the specific construction of trailing arm suspension 10 will be described and it will be labeled with unprimed numerals. The corresponding mirror image parts of trailing arm suspension 10' will be designated with primed numerals corresponding to these unprimed numerals, without an accompanying duplicating description.

Trailing arm suspensions 10 and 10' are affixed directly to longitudinally extending vehicle frame portions 12 and 12', respectively, which are located above vehicle axle 13 which is coupled to differential 14 driven by drive shaft 15.

Trailing arm suspension 10 includes a trailing arm 17, which is a rectangular steel tube. Trailing arm 17 has a fore portion 19, an aft portion 20 and a central portion 21 therebetween. The fore portion 19 is mounted directly onto the outside of frame portion 12 by means of a mounting plate 22 which is attached to frame portion 12 by bolts 23 which extend through bolt holes 123 in plate 22. A shaft 24 has one end welded to plate 22 and extends through and is welded to spacer and reinforcer member 26 which is welded to plate 22 (FIG. 5). A rubber bushing 25 is mounted on shaft 24. A clamp assembly 29, consisting of semicylindrical parts 30 and 31 secured to each other by bolts 32, clamp the fore portion 19 of the trailing arm onto rubber bushing 25. Clamp portion 30 is welded to the trailing arm fore portion 19. Confining plate 27, which prevents the bushing 25 and clamp assembly 29 from moving axially off of shaft 24, is welded at the outer end of shaft 24 and is further secured in position by struts 33. The mounting plate 22 and its associated structure locate the fore portion 19 of trailing arm 17 in a laterally offset manner from the frame portion 12.

Axle 13 is secured to the underside of the central portion 21 of trailing arm 17 by means of a pair of spaced U-bolts 34 on opposite sides of arm 17. The axle 13 is spaced from the underside of the trailing arm by means of a metal wedge pad 35 which is welded to the trailing arm. The axle is confined between wedge pad 35 and the return bend of the spaced U-bolts 34. Wedge pad 35 orients the axle 13 in the proper attitude. The upper ends of the U-bolts 34 extend through U-bolt locking plate 37 located on the upper side of trailing arm 17, and nuts 39 on the ends of U-bolts 34 bear on plate 37 to lock the U-bolts and axle 13 in position. A reinforcing plate 40 (FIG. 6) is secured to the upper side of trailing arm 17, as by welding to distribute the load. A pin 46 extends upwardly from plate 40 to locate the U-bolt locking plate 37.

A shear rubber spring 41 is connected directly between and is located in a laterally offset manner from both the vehicle frame portion 12 and the central portion 21 of trailing arm 17. Shear rubber spring 41 is positioned between shaft 24 and axle 13. Confining plate 27 and spacer member 26 position the fore portion 19 of the arm 17 axially on shaft 24 so that the inner side of arm 17 is spaced the exact distance from frame member 12 as the width of shear rubber spring 41, which fits therebetween. The shear rubber spring 41 includes a rubber body 42 having its opposite sides affixed between metal plates 43 and 44 in the conventional well-known manner. A plate 45 is secured to mounting plate 22 as by welding, and it has a return bend 47 at its upper edge under which the upper edge of shear spring plate 44 is held tightly. Two bolts 48 extend through the two lower corners of shear rubber spring plate 44 to secure it to plate 45. A plate 49 is suitably welded to the inner side of trailing arm 17. Plate 49 has a return bend 56 on its lower edge which tightly receives the lower edge of plate 43, and two bolts 50 extend through the two upper corners of plates 49 and 43, to thus secure this side of shear rubber spring 41 directly to trailing arm 17.

A coil spring 51 extends between the aft portion 20 of trailing arm 17 and frame portion 12. More specifically, the lower end of spring 51 fits within box member 52 (FIG. 6) having upstanding sides 53, 54 and 55 and a bottom plate 57. Sides 53 and 54 and plate 57 constitute a formed channel member. Box member 52 has the ends of sides 53 and 54 welded to plates 55 and 59, and gussets 60, 61, which are suitably welded between the parts, further support box member 52. An upper box member 62 is attached directly to frame portion 12. In this respect, box member 62 is suitably welded to a plate 63 which is secured to frame portion 12 by means of a plurality of bolts 64 at its four corners and at its midsection. More specifically, box member 62 includes a plurality of sides 65, 66, 67 and 69 and a top plate 70. Sides 65 and 66 and 70 constitute a channel section. Sides 67 and 69 are welded to the ends of the channel section. Gussets 71 and 72 are welded between plate 63 and frame sides 67 and 69, respectively. The upper end of spring 51 bears against the top plate 70 of box 62.

A track bar 74 has an end 75 pivotally mounted on bracket 77 welded to trailing arm 17 and its opposite end pivotally mounted to cross frame member 80 which has its opposite ends riveted to frame portions 12 and 12'. The track bar 74 merely functions for maintaining the wheels 11 in proper orientation but does not in any way have a sway bar function. The track bar keeps the tires parallel to the frame as they move up and down.

In operation the shear rubber spring 42 replaces the sway bar and the previously used leaf spring and reduces body roll of the vehicle to provide lateral stability. The body roll is reduced because when forces are applied to the vehicle body which would ordinarily cause body roll about the longitudinal axis of the frame in either direction, portions of each of the rubber bodies 42 or 42' of the shear rubber springs will be placed in compression, and since the rubber bodies are practically incompressible, the vehicle frame will not roll any appreciable amount, considering the direct connections between the trailing arms 17 and 17' and the frame portions 12 and 12', respectively. In contrast to this, the previously used leaf springs, which were replaced by the shear rubber springs in the above-described trailing arm suspensions 10 and 10', did not provide lateral stability, and furthermore the previously used sway bar, which has been eliminated, did not prevent the roll of the vehicle to the extent that the shear rubber springs do. In addition, in the above described trailing arm suspension the shear rubber spring 41 and the coil spring 51, which are connected directly between the frame portion 12 and the trailing arm 17, reduce the loading on the shaft 24 on which the fore portion 19 of the trailing arm is mounted.

Figure 7:
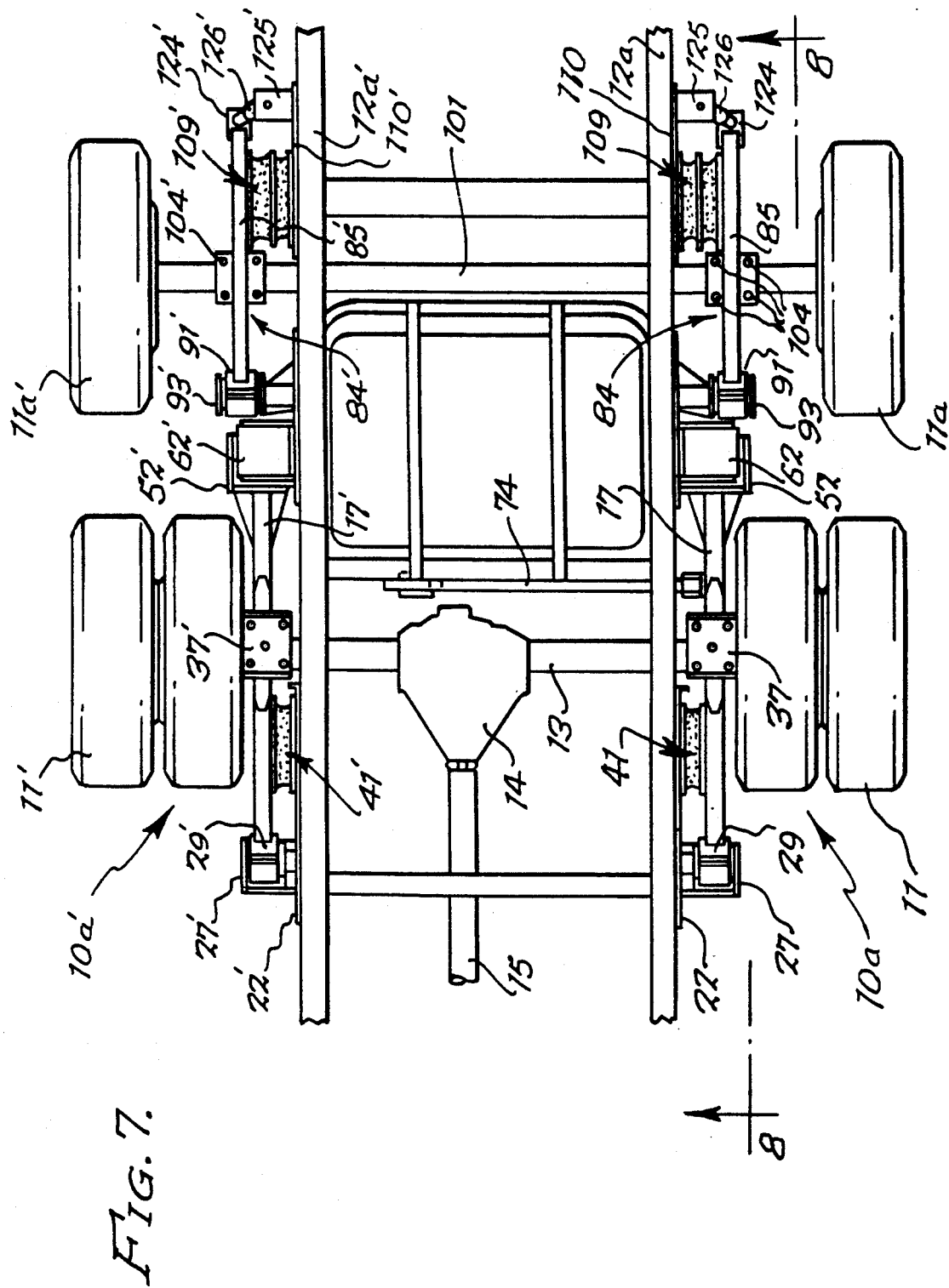
FIG. 7 is a fragmentary plan view of a modified embodiment of the present invention which also includes tag arm assemblies directly coupled to the vehicle frame.

In FIGS. 7 to 10 another embodiment of the present invention is disclosed. In this embodiment trailing arm assemblies 10a and 10a' are shown which are mirror images of each other. Only trailing arm assembly 10a is shown in FIG. 8. All parts of trailing arm assembly 10a are identical to trailing arm assembly 10 of FIGS. 1 to 6 except that the mounting bracket 63a (FIG. 10) differs from mounting bracket 63. Thus, the same numerals will be applied to FIGS. 7 to 10 which denote identical parts of FIGS. 1-6, without an accompanying description.

The structure of FIGS. 7 to 10 includes tag beam assemblies 84 and 84' which are mirror image counterparts of each other on opposite sides of frame portions 12a and 12a' which are modifications of frame portions 12 and 12' of FIGS. 1 to 6. The trailing tag arm assembly 84 includes the trailing arm 85 having a fore portion 87, a central portion 89 and an aft portion 90. The fore portion 87 has a semicylindrical bracket portion 91 suitably welded thereto, and portion 91 is bolted to semicylindrical portion 92 to clamp onto a rubber bushing 93 which is mounted on stub shaft 94 (FIG. 10) having one end welded to plate 95 of mounting plate 63a. Plate 97 and annular ring 98 are welded to shaft 94 to confine rubber bushing 93 thereon. A gusset 99 is welded between plate 95 and the inner portion 100 of shaft 94 to stabilize it. At this point it is to be noted that the only difference between plate 63a of FIG. 10 and plate 63 of FIG. 3 is that the former is longer and carries the shaft 94 which supports the fore portion 87 of tag arm 95.

A nondriven axle 101 is secured to the underside of tag arm 85 by means of a pair of spaced U-bolts 102, the upper ends of which are secured on the top of U-bolt locking plate 106 by means of nuts 104. A plate 103 is suitably welded to the underside of tag arm 85 and U-bolt locking plate 106 is welded to the underside of plate 103. A spacer 107, which is welded to axle 101, is located between axle 101 and plate 106.

A series shear rubber spring assembly 109 is affixed directly between tag arm 85 and frame portion 12a, and this direct connection has the same advantages of trailing arm 17 described above. More specifically, a mounting plate 110 is bolted to frame portion 12a by means of a plurality of bolts 111, and a plate 112 is suitably welded to plate 110, and it has a flange 113 at its upper edge. The shear rubber spring 114 comprises two rubber bodies 115 and 117 having their inner plates 119 secured to each other by bolts 118 at their four corners. The opposite side of rubber body 115 is suitably secured to plate 120 which has its two lower corners bolted to plate 112 with the upper edge of plate 120 underying return bend 113 of plate 112. A plate 121 is suitably attached to shear rubber body 117, and this plate is attached by bolts at its two upper corners to plate 122 which is welded to the inner side of tag arm 85 and has a return bend at its lower edge which tightly receives the lower edge of plate shear rubber spring plate 121. Shear rubber spring 109 comprises the two rubber bodies 115 and 117 in series to thus provide twice the travel of tag arm 85 as would be obtained with a single rubber body. The tag arm assembly thus carries part of the load of the vehicle.

A bracket 124 is welded to the aft end 90 of tag arm 85 and a bracket 125 is welded to the plate 110. The opposite ends of a shock absorber 126 are suitably secured between brackets 124 and 125.

While coil springs have been shown, in certain circumstances other types of springs can be used between the aft portions of the trailing arms and the frame, especially where there is a sufficienitly small travel of the aft portions of the trailing arms, in which event air springs or rubber bumper type springs may be used.

It can thus be seen that the improved trailing arm assemblies of the present invention are manifestly capable of achieving the above enumerated objects, and while preferred embodiments of the present invention have been disclosed, it will be appreciated that it is not limited thereto but may be otherwise embodied within the scope of the following claims.

What is claimed is:

1. In a vehicle having a frame including a frame portion which extends longitudinally of said vehicle and an axle positioned under the frame, a trailing arm axle suspension comprising an elongated trailing arm having fore and aft and central portions extending longitudinally of said vehicle, first means for pivotally mounting said fore portion directly on and laterally offset from said frame portion, shear rubber spring means, second means for mounting said shear rubber spring means directly between and laterally offset from both said central portion of said trailing arm and said frame portion, third means for securing said axle to said central portion of said trailing arm, spring means, and fourth means for securing said spring means directly between said frame portion and said aft portion of said trailing arm.

2. In a vehicle as set forth in claim 1 wherein said shear rubber spring means is located between said axle and said first means.

3. In a vehicle as set forth in claim 1 wherein said spring means comprises a coil spring.

4. In a vehicle as set forth in claim 1 wherein said first means comprises a bracket plate, means connecting said bracket plate to said frame portion, a shaft extending outwardly from said bracket plate, first and second ends on said shaft, means fixedly securing said first end to said bracket plate, a rubber bushing mounted on said shaft, clamp means on said fore portion of said trailing arm securing said trailing arm on said rubber bushing, and confining plate means secured to said second end of said shaft to confine said rubber bushing and said clamp means against axial movement off of said second end of said shaft.

5. In a vehicle as set forth in claim 4 wherein said second means comprises a first spring plate on one side of said shear rubber spring means secured to said frame portion, and a second spring plate on the opposite side of said shear rubber spring means secured to said trailing arm.

6. In a vehicle having a frame including a frame portion which extends longitudinally of said vehicle and an axle positioned under the frame, a trailing arm axle suspension comprising an elongated trailing arm having fore and aft and central portions extending longitudinally of said vehicle, spacer means laterally offset from said frame portion, first means for pivotally mounting said fore portion directly on said frame portion and laterally offset therefrom with said spacer means therebetween, shear rubber spring means having a thickness which is substantially equal to the width of said spacer means, second means for mounting said shear rubber spring means laterally of and directly between both said central portion of said trailing arm and said frame portion, third means for securing said axle to said central portion of said elongated trailing arm, spring means, and fourth means for securing said spring means between said frame portion and said aft portion of said trailing arm.

7. In a vehicle having a frame including first and second spaced frame portions which extend longitudinally of said vehicle and an axle positioned under the frame, a trailing arm axle suspension comprising first and second spaced elongated trailing arms each having fore and aft and central portions extending longitudinally of said vehicle, first means for pivotally mounting said fore portions of said first and second trailing arms directly on said first and second frame portions, respectively, and laterally offset therefrom, first and second shear rubber spring means, second means for mounting said first and second shear rubber spring means directly between and laterally offset from said central portions of said first and second trailing arms, respectively, and said first and second frame portions, respectively, third means for securing said axle to said central portions of said first and second trailing arms, first and second spring means, and fourth means for securing said first and second spring means directly between said first and second frame portions, respectively, and said aft portions of said first and second trailing arms, respectively.

8. In a vehicle as set forth in claim 7 including first and second spacer means having first and second widths located between each of said first and second fore portions of said trailing arms, respectively, and said first and second frame portions, respectively, and said first and second shear rubber spring means having first and second second widths which are substantially equal to said first and second widths of said first and second spacer means, respectively.

9. In a vehicle having a frame including a frame portion which extends longitudinally of said vehicle and an axle positioned under the frame, a trailing arm axle suspension comprising an elongated trailing arm having fore and aft and central portions extending longitudinally of said vehicle, first means for pivotally mounting said fore portion directly on said frame portion, shear rubber spring means, second means for mounting said shear rubber spring means directly between said central portion of said trailing arm and said frame portion, third means for securing said axle to said central portion of said trailing arm, coil spring means, fourth means for securing said coil spring means directly between said frame portion and said aft portion of said trailing arm, said shear rubber spring means being located between said axle and said first means, said frame including a second frame portion which extends transversely to said frame portion, and track bar means effectively coupled between said second frame portion and said trailing arm.

10. In a vehicle as set forth in claim 9 wherein said track bar means is coupled to said trailing arm between said third and fourth means.

11. In a vehicle having a frame including a frame portion which extends longitudinally of said vehicle and an axle positioned under the frame, a trailing arm axle suspension comprising an elongated trailing arm having fore and aft and central portions extending longitudinally of said vehicle, first means for pivotally mounting said fore portion directly on said frame portion, shear rubber spring means, second means for mounting said shear rubber spring means directly between said central portion of said trailing arm and said frame portion, third means for securing said axle to said central portion of said trailing arm, coil spring means, fourth means for securing said coil spring means directly between said frame portion and said aft portion of said trailing arm, said shear rubber spring means being located between said axle and said first means, said first means comprising a bracket plate, means connecting said bracket plate to said frame portion, a shaft extending outwardly from said bracket plate, first and second ends on said shaft, means fixedly securing said first end to said bracket plate, a rubber bushing mounted on said shaft, clamp means on said first end of said trailing arm securing said trailing arm on said rubber bushing, and confining plate means secured to said second end of said shaft to confine said rubber bushing and said clamp means against axial movement off of said second end of said shaft.

12. In a vehicle as set forth in claim 11 wherein said second means comprises a first spring plate on one side of said shear rubber spring means secured to said frame portion, and a second spring plate on the opposite side of said shear rubber spring means secured to said trailing arm.

13. In a vehicle as set forth in claim 12 wherein said fourth means comprises a first coil spring confining plate secured to said aft portion of said trailing arm for bearing against one end of said coil spring, and a second coil spring confining plate secured to said frame portion for bearing on the opposite end of said coil spring.

14. In a vehicle as set forth in claim 13 wherein said frame includes a second frame portion that extends transversely to said frame portion, and track bar means effectively coupled between said second frame portion and said trailing arm.

15. In a vehicle having a frame including a frame portion which extends longitudinally of said vehicle and an axle positioned under the frame, a trailing arm axle suspension comprising an elongated trailing arm having fore and aft and central portions extending longitudinally of said vehicle, first means for pivotally mounting said fore portion directly on said frame portion, shear rubber spring means, second means for mounting said shear rubber spring means directly between said central portion of said trailing arm and said frame portion, third means for securing said axle to said central portion of said trailing arm, coil spring means, fourth means for securing said coil spring means directly between said frame portion and said aft portion of said trailing arm, a trailing tag arm having a tag arm fore portion and a tag arm central portion and a tag arm aft portion, said trailing tag arm being mounted aft of said trailing arm, fifth means pivotally mounting said tag arm fore portion proximate said fourth means, sixth means securing a second axle on said tag arm central portion, second shear rubber spring means, and seventh means securing said second shear rubber spring means directly between said frame portion and said tag arm aft portion.

16. In a vehicle as set forth in claim 15 wherein said second shear rubber spring means comprises two shear rubber springs in series.

17. In a vehicle as set forth in claim 16 wherein said seventh means comprises a first spring plate secured directly to said frame portion, and second spring plate secured directly to said trailing tag arm, and wherein said second shear rubber spring means includes a third spring plate located between said two shear rubber springs.

18. In a vehicle as set forth in claim 17 wherein said shear rubber spring means comprises a fourth spring plate on one side of said shear rubber spring means secured to said frame portion, and a fifth spring plate on the opposite side of said shear rubber spring means secured to said trailing arm.

19. In a vehicle as set forth in claim 18 including shock absorber means, and means for coupling said shock absorber means between said tag arm aft portion and said frame portion.

* * * * *